United States Patent
Chen et al.

(10) Patent No.: US 6,769,776 B1
(45) Date of Patent: Aug. 3, 2004

(54) COLOR WHEEL ASSEMBLY

(75) Inventors: Shih-En Chen, Taipei (TW);
Chih-Neng Chang, Taipei (TW);
Ke-Shu Chin, Junghe (TW); An-Hwa Yu, Shinjuang (TW)

(73) Assignee: Prodisc Technology Inc., Taipei (TW)

( * ) Notice: Subject to any disclaimer, the term of this patent is extended or adjusted under 35 U.S.C. 154(b) by 0 days.

(21) Appl. No.: 10/611,872

(22) Filed: Jul. 3, 2003

(30) Foreign Application Priority Data

Feb. 24, 2003 (TW) .................................... 92202800 U

(51) Int. Cl.[7] .......................... G03B 21/14; H04N 9/12; G02B 5/22; G02B 7/00
(52) U.S. Cl. ......................... 353/84; 348/743; 359/892
(58) Field of Search ................ 353/31, 84; 348/743; 359/889, 892

(56) References Cited

U.S. PATENT DOCUMENTS

| | | | | |
|---|---|---|---|---|
| 5,868,482 A | * | 2/1999 | Edlinger et al. | 353/84 |
| 6,030,100 A | * | 2/2000 | Yu | 362/276 |
| 6,185,047 B1 | * | 2/2001 | Peterson et al. | 359/640 |
| 6,471,356 B1 | * | 10/2002 | Gohman et al. | 353/33 |
| 6,474,818 B1 | * | 11/2002 | Engle | 353/84 |
| 6,601,959 B2 | * | 8/2003 | Miyata et al. | 353/98 |
| 6,604,830 B1 | * | 8/2003 | Chiu et al. | 353/84 |
| 6,642,969 B2 | * | 11/2003 | Tew | 348/743 |

* cited by examiner

*Primary Examiner*—Christopher Mahoney
(74) *Attorney, Agent, or Firm*—Birch, Stewart, Kolasch & Birch, LLP

(57) ABSTRACT

A color wheel asssembly including a color filter, a motor, a fixing element, and an optical element. The motor has a housing and a motor body, and the housing is set to a side of a central axis of the motor body. The color filter is set on the housing of the motor. The motor body is fixed on the fixing element. A holder is formed on the fixing element, and the holder outwardly extends from the fixing element. The optical element is jointed with the holder. In addition, the invention also provides a color wheel assembly further including an auxiliary fixing element, which is set on fixing element and has an outwardly extending holder with which the optical element is jointed.

18 Claims, 3 Drawing Sheets

1311

1311

1311

COLOR WHEEL ASSEMBLY

BACKGROUND OF THE INVENTION

1. Field of the Invention

The invention relates to a color wheel assembly and more particularly, this invention relates to a color wheel assembly, which is used in projection technology.

2. Description of the Related Art

Currently, image projection systems have become popular items in the optoelectronic industry owing to multiple requirements of a system having large display area, small dimension, and thin, light composition.

The popular projection systems are divided into three types including a liquid crystal display (LCD) type, a liquid crystal on silicon (LCoS) type, and a digital light processing (DLP) type, wherein the single-panel LCoS and DLP types advantageously have simplified systems and the following description will take the DLP type as an example.

In a DLP projector, a digital control method and a reflection principle are adopted. For a SCR (Sequential Color Recapture) system, light rays are integrated or converged by a light integration rod and then pass through the color filter of the color wheel, which splits the light rays. The split light rays are then projected onto a digital micro-mirror device (DMD). In this technology, the DMD is used to replace the liquid crystal panel for representing images in the conventional liquid crystal projector. Since the DMD includes several movable micro-mirrors, driving electrodes may control the tilt angle and deflection time of each movable mirror. Then, the light rays may be projected to form an image by switching the reflection directions of the light rays.

In the DP projector, different clamping mechanisms are used to fix the color wheel and the light integration rod in the DLP projector so that the relative position between the color wheel and the light integration rod may be controlled. In the projection system, the position of each optical device through which light rays pass relates to the overall imaging quality of the DLP projector. So, each optical device has to be precisely positioned. Furthermore, when the color wheel is a SCR color wheel, the alignment precision between the color wheel and the light integration rod is more highly required.

However, since the conventional color wheel and light integration rod are fixed to different clamping mechanisms, respectively, the relative position between the color wheel and the light integration rod has to be adjusted. In addition, the relative position between other optical devices and the color wheel and the light integration rod also has to be noted. Consequently, it is necessary to spend longer time to artificially adjust the relative position between the color wheel and the light integration rod as well as that between other optical devices and the color wheel and light integration rod. Meanwhile, the precision of correctly adjusting the relative position between the color wheel and the light integration rod also cannot be easily controlled, and the reproducibility is also poor.

SUMMARY OF THE INVENTION

In view of the above-mentioned matters, an object of the invention is to provide a color wheel assembly capable of solving the positioning problems between a color wheel and an optical element.

To achieve the above-mentioned object, the invention provides a color wheel assembly including a color filter, a motor, a fixing element, and an optical element. The motor has a housing and a motor body, and the housing is set to a side of a central axis of the motor body. The color filter is set on the housing of the motor. The motor body is fixed on the fixing element. A holder is formed on the fixing element, and the holder outwardly extends from the fixing element. The optical element is jointed with the holder. In addition, the invention also provides a color wheel assembly further including an auxiliary fixing element, which is set on the fixing element and has an outwardly extending holder with which the optical element is jointed.

The color wheel assembly of the invention has the outwardly extending holder to joint the color wheel with the optical element. Compared to the prior art, during the aligning step, the relative position between the color wheel and the optical element in this invention needs not to be adjusted using different clamping mechanisms. Instead, the relative position between the color wheel and the optical element is fixed by using the holder of the fixing element or the auxiliary fixing element, and only the relative position between the color wheel assembly and other optical devices of the projector needs to be adjusted. Consequently, the invention is laborsaving and timesaving in adjustment. Meanwhile, since no unnecessary clamping mechanism is needed, the dimension of the projector may be reduced, and the manufacturing cost may be further decreased. In addition, the alignment precision and reproducibility are also improved, and the overall quality of the projector is also improved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The color wheel assemblies according to the preferred embodiments of the invention will be described with reference to the accompanying drawings.

Figure 1A:
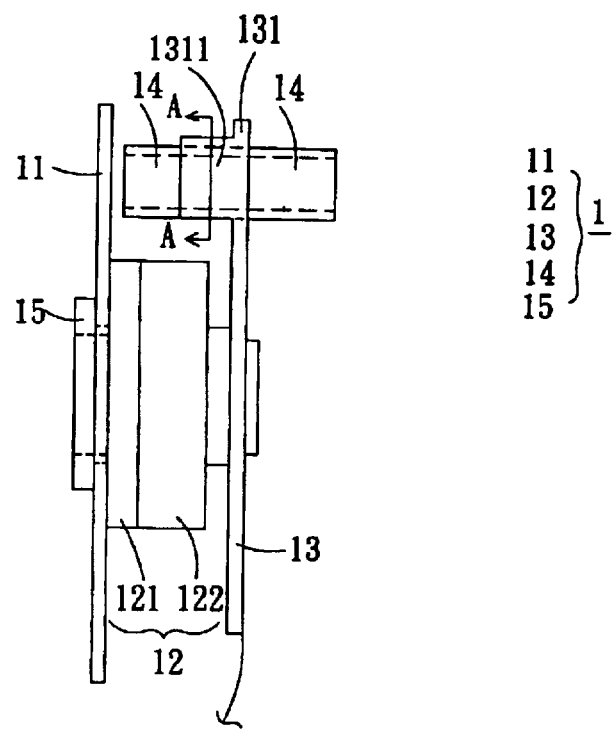
FIGS. 1A and 1B are schematic side views showing a color wheel assembly according to a first embodiment of the invention.
Figure 1B:
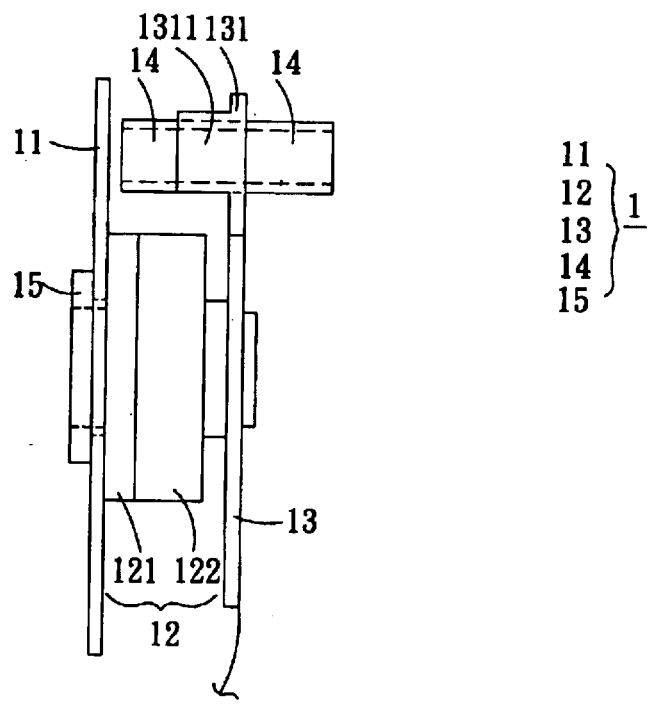

Referring to FIGS. 1A and 1B, a color wheel assembly 1 according to a first embodiment of the invention includes a color filter 11, a motor 12, a fixing element 13, and an optical element 14. The motor 12 has a housing 121 and a motor body 122, and the housing 121 is set to a side of a central axis of the motor body 122. The color filter 11 is set on the housing 121 of the motor 12. The motor body 122 is fixed to the fixing element 13. A holder 131 is formed on the fixing element 13, and the holder 131 outwardly extends from the fixing element 13. The optical element 14 is connected with the holder 131 by jointing part 1311.

The color filter 11 may be a circular filter or a ring-shaped filter composed of a red section, a green section, and a blue section. Alternatively, the color filter 11 also may be a circular filter or a ring-shaped filter composed of a red section, a green section, a blue section, and a transparent section. Of course, the color filter 11 also may be a ring-shaped transparent plate or a circular transparent plate, on which at least a red film, at least a green film, and at least a blue film are formed.

As shown in FIGS. 1A and 1B, the motor 12 is composed of the housing 121 and the motor body 122, and the housing 121 is set to a side of a central axis of the motor body 122. In addition, the color filter 11 is set on the housing 121 of the motor 12. Herein, the color filter 11 is set on the housing 121 by way of, for example, a fitting, adhering process or placing the color filter 11 over the housing 121.

The motor body 122 is mainly composed of a shell (not shown), a magnetic ring (not shown), laminated steel stack (not shown) and a coil (not shown). When the coil is powered on, the laminated steel stack produces a magnetic force and a magnetic field. Controlling the positive/negative property and the intensity of the flowing current may change the magnetic field in sequence, or produce a rotating magnetic field, to interact with the magnetic ring and thus cause the magnetic ring to rotate.

In this embodiment, the motor body 122 is fixed on the fixing element 13, and the fixing element 13 has the outwardly extending holder 131. In this case, the fixing element 13 is a fixing plate for fixing the color wheel assembly 1 to a projector (not shown).

The fixing element 13 and the holder 131 are integrally formed, as shown in FIG. 1A. In addition, the fixing element 13 is connected to or jointed with the holder 131, as shown in FIG. 1B. In this case, the fixing element 13 may be connected to or jointed with the holder 131 by way of adhering, riveting or screwing.

Please refer to FIGS. 1A and 1B again. The holder 131 is jointed with the optical element 14. In this embodiment, the optical element 14 is used to guide light rays or change the travelling directions of light rays, for example, and to converge light rays. In addition, the optical element 14 may also homogenize the brightness distribution of light rays and control the length-to-width ratio of the projected image. In this embodiment, the optical element 14 is a light integration rod, which is generally called as a rod, a light tunnel, a light pipe, etc. In the field of the art. Of course, the optical element 14 also may be a lens. In this case, the holder 131 may be jointed with the optical element 14 by way of adhering, riveting, or screwing. In the way of adhering, an adhesive may be used to adhere the optical element 14 to the holder 131, wherein the adhesive may be a light-cured adhesive or a heat-cured adhesive. Of course, it is also possible to adhere the optical element 14 to the holder 131 by the light-cured adhesive for positioning them followed by the heat-cured adhesive to reinforce the connection therebetween.

Figure 2A:
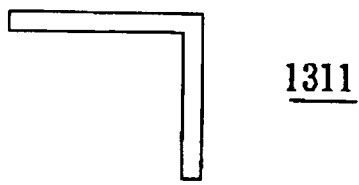
FIGS. 2A to 2C are cross-sectional views showing the holder taken along a line A—A of FIG. 1A.
Figure 2B:
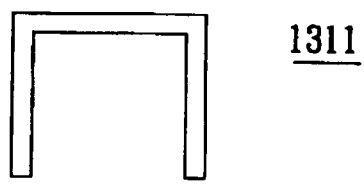
Figure 2C:
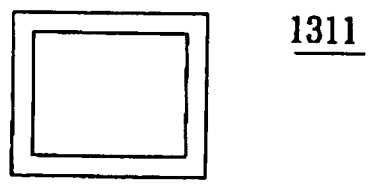

In addition, the connection portion between the holder 131 and the optical element 14 has a shape matching with the external shape of the optical element 14. The cross section of the holder 131 with the jointing part 1311 taken along a line A—A of FIG. 1A may be of an "L" shape (FIG. 2A), a "⊓" shape (FIG. 2B), a rectangular ring shape (FIG. 2C), or the like.

Please refer to FIGS. 1A and 1B again. The color wheel assembly 1 in this embodiment further includes a cap 15 set on the color filter 11 by way of embedding or adhering. In this case, the cap 15 is used to enlarge the adhesion area between the color filter 11 and the housing 121.

Figure 3A:
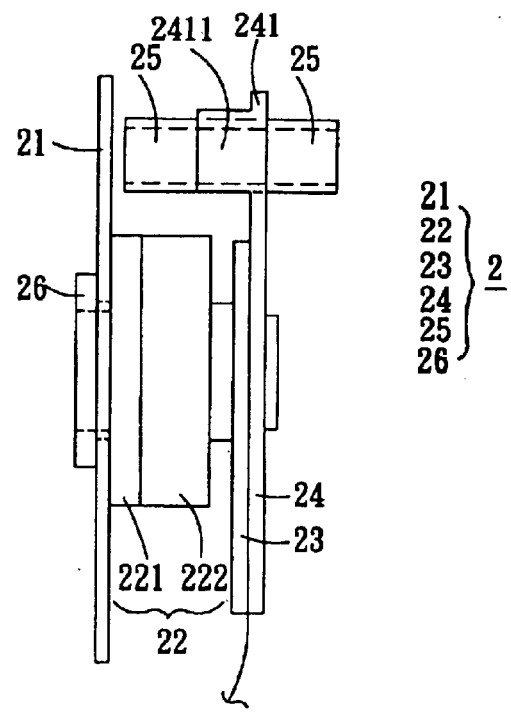
FIGS. 3A and 3B are schematic side views showing a color wheel assembly according to a second embodiment of the invention.
Figure 3B:
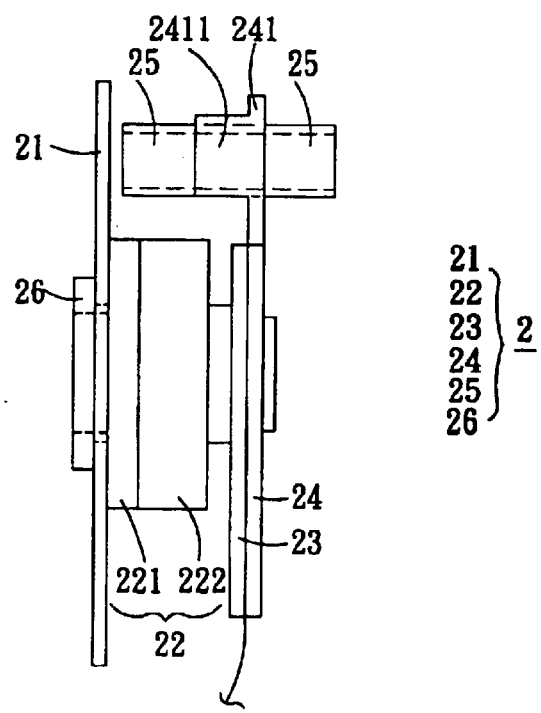

In addition, as shown in FIGS. 3A and 3B, a color wheel assembly 2 according to a second embodiment of the invention includes a color filter 21, a motor 22, a fixing element 23, an auxiliary fixing element 24, and an optical element 25. The motor 22 is composed of a housing 221 and a motor body 222, wherein the housing 221 is set to a side of a central axis of the motor body 222. The color filter 21 is set on the housing 221 of the motor 22, and the motor body 222 is fixed on the fixing element 23. The auxiliary fixing element 24 is set on the fixing element 23 and has an outwardly extending holder 241. The optical element 25 is jointed with the holder 241.

Furthermore, as shown in FIGS. 3A and 3B, the color wheel assembly 2 in this embodiment further includes a cap 26 set on the color filter 21.

In the second embodiment, in addition to the fixing element 23 and the auxiliary fixing element 24, other elements have the same features and functions as those in the first embodiment, and detailed descriptions thereof will be omitted.

The motor body 222 is fixed to the fixing element 23. Herein, the fixing element 23 is a fixing plate for fixing the color wheel assembly 2 to a projector (not shown). In addition, the auxiliary fixing element 24 is set on the fixing element 23 and has the outwardly extending holder 241. In this embodiment, the alignment of the auxiliary fixing element 24 and the fixing element 23 are aligned under a microscope. Then, the auxiliary fixing element 24 is fixed to the fixing element 23 by way of adhering followed by solder bonding. Of course, the auxiliary fixing element 24 also may be fixed to the fixing element 23 by way of adhering, riveting, screwing or solder bonding.

In this embodiment, the auxiliary fixing element 24 and the holder 241 are integrally formed, as shown in FIG. 3A. In addition, the auxiliary fixing element 24 is fixed to the holder 241, as shown in FIG. 3B. Herein, the auxiliary fixing element 24 may be fixed to the holder 241 by way of adhering, riveting, or screwing.

In addition, the way of jointing the holder 241 with the optical element 25 and the shape of the holder 241 in the second embodiment are the same as those in the first embodiment.

Because the invention utilizes the fixing element of the color wheel assembly to fix and position the color wheel and the optical element in the projector, the relative position between the color wheel and other optical devices of the projector has to be adjusted, but the relative position between the color wheel and the optical element needs not to be adjusted.

The color wheel assembly of the invention has the outwardly extending holder to joint the color wheel with the optical element. Compared to the prior art, during the aligning step, the relative position between the color wheel and the optical element in this invention needs not to be adjusted using different clamping mechanisms. Instead, the relative position between the color wheel and the optical element is fixed by using the holder of the fixing element or the auxiliary fixing element, and only the relative position between the color wheel assembly and other optical devices of the projector needs to be adjusted. Consequently, the invention is laborsaving and timesaving in adjustment. Meanwhile, since no unnecessary clamping mechanism is needed, the dimension of the projector may be reduced, and the manufacturing cost may be further decreased. In addition, the alignment precision and reproducibility are also improved, and the overall quality of the projector is also improved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A color wheel assembly, comprising:
    a color filter;
    a motor having a housing and a motor body, the housing being set to a side of a central axis of the motor body, and the color filter being set on the housing of the motor;
    a fixing element on which the motor body is fixed, and the fixing element having an outwardly extending holder, the outwardly extending holder having a jointing part; and
    an optical element jointed with the holder.

2. The color wheel assembly according to claim 1, wherein the fixing element and the holder are integrally formed.

3. The color wheel assembly according to claim 1, wherein the fixing element is jointed with the holder.

4. The color wheel assembly according to claim 1, wherein the fixing element is a fixing plate.

5. The color wheel assembly according to claim 1, wherein the optical element is a light integration rod.

6. The color wheel assembly according to claim 1, further comprising:
    a cap set on the color filter.

7. A color wheel assembly, comprising:
    a color filter;
    a motor having a housing and a motor body, the housing being set to a side of a central axis of the motor body, and the color filter being set on the housing of the motor;
    a fixing element on which the motor body is fixed;
    an auxiliary fixing element set on the fixing element and having an outwardly extending holder, the outwardly extending holder having a jointing part; and
    an optical element jointed with the holder.

8. The color wheel assembly according to claim 7, wherein the auxiliary fixing element and the holder are integrally formed.

9. The color wheel assembly according to claim 7, wherein the auxiliary fixing element is jointed with the holder.

10. The color wheel assembly according to claim 7, wherein the fixing element is a fixing plate.

11. The color wheel assembly according to claim 7, wherein the optical element is a light integration rod.

12. The color wheel assembly according to claim 7, wherein the fixing element is jointed with the auxiliary fixing element by way of adhering followed by solder bonding.

13. The color wheel assembly according to claim 7, wherein the fixing element is jointed with the auxiliary fixing element by way of solder bonding.

14. The color wheel assembly according to claim 7, wherein the fixing element is jointed with the auxiliary fixing element by way of adhering.

15. The color wheel assembly according to claim 7, wherein the fixing element is jointed with the auxiliary fixing element by way of riveting.

16. The color wheel assembly according to claim 7, wherein the fixing element is jointed with the auxiliary fixing element by way of screwing.

17. The color wheel assembly according to claim 7, further comprising:
    a cap set on the color filter.

18. A color wheel assembly, comprising:
    a color filter;
    a motor having a housing and a motor body, the housing being set to a side of a central axis of the motor body, and the color filter being set on the housing of the motor;
    a fixing element on which the motor body is fixed, and the fixing element having an outwardly extending holder;
    an optical element jointed with the holder; and
    means for joining the optical element to the fixing element whereby the relative position between the color filter and optical element are fixed.

* * * * *